United States Patent [19]

Cuscurida

[11] Patent Number: 4,785,127

[45] Date of Patent: Nov. 15, 1988

[54] VINYL POLYMER POLYOLS MADE USING PARTIALLY ALKOXYLATED POLYOXYALKYLENEAMINES

[75] Inventor: Michael Cuscurida, Austin, Tex.

[73] Assignee: ARCO Chemical Company, Newtown Square, Pa.

[21] Appl. No.: 762,351

[22] Filed: Aug. 5, 1985

[51] Int. Cl.$^4$ ............................................ C07C 121/66
[52] U.S. Cl. ..................................... 558/388; 526/211
[58] Field of Search ......................... 558/388; 526/211

[56] References Cited

U.S. PATENT DOCUMENTS

| | | | |
|---|---|---|---|
| 3,008,917 | 11/1961 | Park et al. ............................ | 260/45.4 |
| 3,304,273 | 2/1967 | Stamberger ............................ | 260/2.5 |
| 3,325,421 | 6/1967 | Muller et al. ......................... | 252/308 |
| 3,383,351 | 5/1968 | Stamberger ........................... | 260/33.2 |
| 4,104,236 | 8/1978 | Simroth ................................ | 252/182 |
| 4,125,505 | 11/1978 | Critchfield et al. .................. | 526/209 |
| 4,148,840 | 4/1979 | Shah ..................................... | 521/137 |
| 4,214,055 | 7/1980 | Seefried et al. ....................... | 521/137 |
| 4,226,756 | 10/1980 | Critchfield et al. ............ | 260/33.2 R |
| 4,242,249 | 12/1980 | Van Cleve et al. ............ | 260/33.2 R |
| 4,286,074 | 8/1981 | Davis et al. .......................... | 521/137 |
| 4,321,342 | 3/1982 | Davis et al. .......................... | 525/530 |
| 4,465,858 | 8/1984 | Cuscurida et al. .................. | 564/477 |
| 4,521,581 | 6/1985 | Dominguez et al. ................ | 528/57 |
| 4,523,025 | 6/1985 | Cuscurida et al. ................... | 560/60 |
| 4,539,378 | 9/1985 | Cuscurida et al. .................. | 525/407 |

Primary Examiner—Anton H. Sutto
Attorney, Agent, or Firm—Steve Rosenblatt; David H. Mossman

[57] ABSTRACT

A vinyl polymer polyol is prepared by the free radical initiated polymerization of vinyl monomers using partially alkoxylated polyoxyalkyleneamines as the dispersing media. The vinyl polymer polyols of this invention give faster curing flexible polyurethane foams with improved load-bearing properties.

11 Claims, No Drawings

VINYL POLYMER POLYOLS MADE USING PARTIALLY ALKOXYLATED POLYOXYALKYLENEAMINES

BACKGROUND OF THE INVENTION

1. Field of the Invention

This invention relates to polymer dispersions in partially alkoxylated polyoxyalkyleneamines, and more particularly relates to dispersions of polymers made from various vinyl monomers in the presence of partially alkoxylated polyoxyalkyleneamines as the dispersing media.

2. Description of the Related Art

Conventional polyols useful in the production of flexible polyurethane foams are usually made by the reaction of a polyhydric alcohol with an alkylene oxide, usually ethylene oxide and/or propylene oxide, to a molecular weight of about 2,000 to 3,000 and above. These polyols are then reacted with polyisocyanates in the presence of water or other blowing agents such as fluorocarbons to obtain polyurethane foams. Polyols have been modified in many ways to improve the properties of the polyurethanes made from them. One common method of modifying polyols involves the use of polymers as the dispersed phase. One variation available entails the polymerization of vinyl monomers such as acrylonitrile and styrene in a polyol media. Another method includes the polymerization of vinyl monomers in polyol-isocyanate addition products. Another involves the preparation of polyurea polymers by the reaction of diamines with diisocyanates in a polyol media.

U.S. Pat. No. 3,008,917 to Park, et al., for example, teaches the addition of an unsaturated liquid monomer such as styrene to a polyester-isocyanate adduct which itself contains vinyl unsaturation. The resulting mixture is then copolymerized through the unsaturated linkages. U.S. Pat. No. 3,304,273 to Stamberger discloses a polymer polyol having radicals reactive with the —N═C═O radicals of an organic polyisocyanate (such as polymers of acrylic acid, allyl alcohol, styrene, butadiene, etc.) combined with a large amount of a solvent which also contains radicals reactive with an isocyanate group, but which has little or no ethylenic unsaturation (such as a polyol). U.S. Pat. No. 3,383,351 to Stamberger discloses similar polymer polyols where the dispersed polymers consist of polymerized ethylenically unsaturated monomers such as methacrylonitrile, styrene, etc., particularly copolymers using more than one kind of unsaturated monomer.

U.S. Pat. No. 4,104,236 to Simroth reveals a liquid polymer polyol composition containing 45–90 wt. % of a polyoxypropylene polyol having a molecular weight of at least 1500, and 55 to 10 wt. % of a polymer. The polymer consists of 60 to 90 wt. % polymerized acrylonitrile and 40 to 10 wt % of polymerized styrene. Polyurethane foams having high load-bearing properties and solid polyurethane elastomers having a high modulus were made from these materials. A polymer polyol consisting of 45 to 95 wt. % of a poly(oxypropyleneoxyethylene) polyol having a hydroxyl number of 20 to 60, an oxyethylene cap of 10 to 30 wt. %, an internal oxyethylene content of 5 to 60 wt. % and from 5 to 60 wt. % of a polymerized vinyl monomer (such as a copolymer of styrene and acrylonitrile) is taught in U.S. Pat. No. 4,125,505 to Critchfield, et al. Further, U.S. Pat. No. 4,148,840 to Shah, et al. discloses polymer polyol compositions made by polymerizing one or more ethylenically unsaturated monomers in a polyol.

High resilience urethane foams may be prepared from tolylene diisocyanate and polymer polyol compositions which were made by polymerizing acrylonitrile and vinylidene chloride monomers in polyols, as taught by U.S. Pat. No. 4,214,055 to Seefried, et al. Foams made from the novel polymer polyols showed enhanced load-bearing properties and a decrease in flammability. U.S. Pat. No. 4,226,756 to Critchfield, et al. teaches that polyol/ vinyl polymer blends made by polymerizing acrylonitrile, styrene and/or methyl methacrylate in the presence of polyethylene-polypropylene glycols are useful in producing polyurethanes. Polymer stabilizers made by polymerizing 30:70 acrylonitrile-styrene mixtures with polypropylene glycol monobutyl ether methacrylate are disclosed by U.S. Pat. No. 4,242,249 to Van Cleve, et al. as useful stabilizers for polyol-vinyl monomer reaction products.

U.S. Pat. No. 4,521,581 to Dominguez, et al. discloses a method of making polymer polyols by mixing a relatively low molecular weight liquid polymer of an ethylenically unsaturated monomer with a polyol and crosslinking it in the polyol. U.S. patent application Ser. No. 472,341, now abandoned, describes a method of making polymer prepolymers in which a relatively low molecular weight liquid polymer of an ethylenically unsaturated monomer is mixed with an isocyanate terminated prepolymer and crosslinked in the prepolymer.

U.S. Pat. No. 3,325,421 to Miller, et al. describes polyurea polymer polyols made by reacting diamines with diisocyanate using a polyol as the dispersing media. U.S. Pat. No. 4,539,378 teaches of a vinyl polymer polyol prepared by polymerizing via a free radical reaction a vinyl monomer component having at least one vinyl monomer in the presence of an epoxy resin modified polyol having a molecular weight of 2,000 to 7,000. The free radical-containing polymerization of vinyl monomers using epoxy resin-modified polyols as the reaction media gives polymer polyols which are more effective than conventional polymer polyols in increasing the load-bearing properties of flexible foams. U.S. Pat. No. 4,523,025 to Cuscurida describes polymer polyols made from partially alkoxylated polyoxyalkyleneamines reacted with an organic polyisocyanate in a polyether polyol.

The art cited heretofore primarily discloses variations of the preparation of polymer polyols by a procedure using a polyol as the dispersing media.

U.S. Pat. No. 4,286,074 to Davis, et al. teaches the preparation of copolymer dispersions by the in situ polymerization of an ethylenically unsaturated monomer or mixture of monomers in the presence of a free radical initiator in an amine-terminated polyoxyalkylene polyether polymer. These dispersions were found useful in the preparation of polyurethane foams which have improved tensile strength, elongation, load deflection and tear strength properties.

The materials found to be useful as the dispersing media in this invention are partially alkoxylated polyoxyalkyleneamines. Generally, the partially alkoxylated polyoxyalkyleneamine is prepared by the addition of at least one alkylene oxide to an aqueous polyoxyalkyleneamine as described in U.S. Pat. 4,465,858 to Cuscurida, et al., incorporated by reference herein.

SUMMARY OF THE INVENTION

This invention is a vinyl polymer polyol prepared by the free-radical initiated polymerization of vinyl monomers using partially alkoxylated polyoxyalkyleneamines as the dispersing media.

DETAILED DESCRIPTION OF THE PREFERRED EMBODIMENTS

Preparation of polymer polyols by the free-radical catalyzed polymerization of vinyl monomers using polyols or amine-terminated polyethers as the dispersing media is known. These polymer polyols have been used to improve the properties, particularly the firmness of molded high resilience foam used in automotive seating and slab flexible foam used in carpet underlay.

This invention entails the discovery of the preparation of polymer polyols by the free-radical initiated polymerization of vinyl monomers using partially alkoxylated polyoxyalkyleneamines having a molecular weight of 2,000 to 8,000 as the dispersing media. This invention utilizes dispersing media which contain both —$NH_2$ and —OH groups instead of either of the two singularly. This material offers the best of both —$NH_2$ and —OH terminated media. Incorporation of the —$NH_2$ group produces faster curing foams, yet offering controlled reactivity not found using solely amine terminated materials. The dispersing material of this invention has a functionality of 4–6 allowing more opportunities for crosslinking, producing firmer foams than those prepared with the polymer polyols of the prior art.

The Reactants

The monomers useful in the process of this invention are the polymerizable monomers characterized by the presence therein of at least one polymerizable ethylenic unsaturated group of the type

The monomers can be used singly or in combination to produce homopolymer/reactive solvent products or copolymer/reactive solvent combinations, respectively.

Preferably, the monomers contain the double bond in a vinyl group. These monomers are well known in the art and include the hydrocarbon monomers such as styrene, butadiene, isoprene, 1,4-pentadiene, 1,6-hexadiene, 1,7-octadiene, α-methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethyl styrene, iodostyrene, cyanostyrene, nitrostyrene, N,N-dimethylaminostyrene, acetoxystyrene, methyl 4-vinylbenzoate, phenoxystyrene p-vinyldiphenyl sulfide, p-vinylphenyl oxide, and the like. Also suitable are acrylic and substituted acrylic monomers such as acrylic acid, methacrylic acid, acrylonitrile, methyl methacrylate, methyl acrylate, 2-hydroxyethyl acrylate, 2-hydroxyethyl methacrylate, cyclohexylmethacrylate, benzyl methacrylate, isopropyl methacrylate, octyl methacrylate, methacrylonitrile, methyl alpha-chloroacrylate, ethyl alpha-ethoxy acrylate, methyl alphaacetaminoacrylate, butyl acrylate, 2-ethylhexyl acrylate, phenyl acrylate, phenyl methacrylate, α-chloroacrylonitrile, N,N-di-methylacrylamide, N,N-dibenzylacrylamide, N-butylacrylamide, methacrylyl formamide, and the like. The vinyl esters, vinyl ethers, vinyl ketones, etc. are also useful, such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinyldiene bromide, 1-chloro-1-fluoroethylene, vinyldiene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran,2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyacetamide, N-vinylpyrrolidone, vinyl imidazole, divinyl sulfide, divinyl sulfone, sodium vinyl sulfoxide, methyl vinyl sulfonate, N-vinyl pyrrole and the like. Other compounds expected to be useful are dimethyl fumarate, dimethyl maleate, maleic acid, crotonic acid, fumaric acid, itaconic acid, monomethyl itaconate, t-butyl aminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

Vinyl monomers are preferred, and styrene, acrylonitrile, methyl methacrylate, methyl acrylate and butadiene are particularly preferred. It is especially preferred that styrene and acrylonitrile be used together. The preferred weight ratio of styrene to acrylonitrile ranges from 9:1 to 1:9. Any of the known chain transfer agents can be present, if desired.

Polymerizing the monomers in the partially alkoxylated polyoxyalkyleneamine occurs in the presence of a catalytically effective amount, preferably 0.1 to 5.0 wt. % based on total feed, of a conventional free radical catalyst known to be suitable for the polymerization of ethylenically unsaturated monomers. Preferred catalysts are the azo-bis compounds such as 2,2'-azobis(2,4-dimethylvaleronitrile), 2,2'-azobis(isobutyronitrile), 2,2'-azobis-(2-methylbutyronitrile) and 1,1'-azobis(-cyanocyclohexane) and the like. Other preferred catalysts are organic peroxides, peroxydicarbonates and peroxyesters. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(pmethoxybenzoyl) peroxide, p-monomethoxybenzoyl peroxide, rubrene peroxide, ascaridole, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, persuccinic acid, diisopropyl peroxy dicarbonate, and the like. A mixture of catalysts may also be used.

Especially preferred are polymerization catalysts manufactured by the E. I. duPont de Nemours and Co. such as 2,2'-azobis(2,4-dimethylvaleronitrile), 2,2'-azobis(isobutyronitrile), 2,2'-azobis-(2-methylbutyronitrile) and 2,2'-azobis-(2-methylbutyronitrile). These products are commercially sold as VAZO ® 52, 64, 67, and 88, respectively.

The polymerization occurs using a partially alkoxylated polyoxyalkyleneamine as the dispersing media. This material may be made by the addition of at least one alkylene oxide to an aqueous polyoxyalkyleneamine. The alkylene oxide should have 2 to 8 carbon atoms, and the polyoxyalkyleneamine should have a molecular weight of from 2,000 to 5,000. The proportion of water ranges from 5 to 15 wt. % based on the polyoxyalkyleneamine present, and the addition is conducted at a temperature between about 75 and 85° C. The proportion of alkylene oxide used is less than that necessary to totally alkoxylate the polyoxyalkyleneamine. Subsequently, the reaction mixture is digested at a temperature at or above 75° C. to give an alkoxylated polyoxyalkyleneamine product having a tertiary amine content of less than 90%. Other details about the preparation of the partially alkoxylated polyoxyalkyleneamines useful in this invention may be found in U.S. Pat. No. 4,465,858 which is incorporated herein by reference.

The Reaction Conditions

To obtain the vinyl polymer polyols of this invention, all or a portion of the partially alkoxylated polyoxyalkyleneamine is preferably added first to the reaction vessel. It is usually best that the material be heated to the reaction temperature before the next step, which is the slow or dropwise addition of a mixture of the vinyl monomer component (which may be more than one kind of vinyl monomer), the free radical initiator and the remainder of the partially alkoxylated polyoxyalkyleneamine. After the reaction proceeds for a short time (0.25 to 1.0 hour), the reaction mixture is digested for approximately 15 minutes and volatiles are stripped off by conventional techniques to leave the vinyl polymer polyol product.

The reaction temperature should be about 75° to 150° C., preferably 90° to 140° C. Reaction pressures may range from atmospheric pressure to about 100 psig. When mixed vinyl monomers are used, such as styrene and acrylonitrile, the weight ratios should range from about 9:1 to 1:9, or preferably 30:70 to 70:30. The amount of polymer in the partially alkoxylated polyoxyalkyleneamine, known as polymer loading, may range from 5 to about 50 wt. %, preferably from about 10 to 40 wt. %.

The preparation of the vinyl polymer polyols will be further illustrated by the following non-limiting examples. The use of the vinyl polymer polyols of this invention in flexible, high resilience polyurethane foams will also be demonstrated. The advantages over foams made from conventional polymer polyols will also be shown.

EXAMPLE 1

This example will illustrate the preparation of a partially alkoxylated polyoxyalkyleneamine used as the dispersing media of this invention. For this particular illustration, the 3 mole ethylene oxide adduct of a polyoxypropylene triamine having a molecular weight of 5,000 (JEFFAMINE ® T-5000, a product of Texaco Chemical Co.) will be prepared.

JEFFAMINE T-5000 (40 lb) and water (2.0 lb) were charged into a 10-gallon kettle. The reactor was then purged with prepurified nitrogen. Ethylene oxide (1.0 lb) was then reacted at 85° C. and the reaction mixture digested three hours at 125° C. The reaction mixture was then stripped to a minimum pressure at 125° C., nitrogen stripped and polish filtered. The finished product had the following properties:

| | |
|---|---|
| Total acetylatables, meq/g | 0.95 |
| Total amine, meq/g | 0.52 |
| Primary amine, meq/g | 0.15 |
| Secondary amine, meq/g | 0.22 |
| Tertiary amine, meq/g | 0.15 |
| Water, wt. % | 0.1 |
| Color, Pt—Co | 15 |

EXAMPLE 2

This example will demonstrate the preparation of the polymer polyols of this invention.

Into a 2-liter, three-necked flask equipped with a stirrer, thermometer, dropping funnel, water condenser and nitrogen source were charged 600g of the partially ethoxylated JEFFAMINE T-5000 of Example 1 (JEFFAMINE T-5000·3 ethylene oxide). A premixed blend of 200g of JEFFAMINE T-5000·3 ethylene oxide, 90 g styrene, 110 g acrylonitrile and 5.0 g of 2,2'azobis(2-methylbutyronitrile) was then added dropwise to the reaction flask at 102°–110° C. over a 50 minute period. The reaction mixture had turned into a white, viscous dispersion during this period. The reaction mixture was then digested for 15 minutes and stripped for 40 minutes at 5 mm Hg. Unreacted volatiles (7.9 g) were recovered in a cold trap. This indicated a monomer conversion of 96%. The finished product had the following properties:

| | |
|---|---|
| Hydroxyl number, mg KOH/g | 42.6 |
| Water, wt. % | 0.07 |
| Viscosity, 77° F., cps | 3560 |
| Appearance | White, viscous dispersion |

EXAMPLE 3

This example will show the utility of the polymer polyol of Example 2 in the preparation of flexible high resilience foam. It will further show the superiority of this polymer polyol as compared to JEFFAMINE T-5000 and JEFFAMINE T-5000·3 ethylene oxide in the preparation of stable open-celled foams that do not shrink.

| | A | B | C | D |
|---|---|---|---|---|
| Formulation, pbw | | | | |
| 5,000 molecular wt high reactivity triol[a] | 60 | 100 | 60 | — |
| Polymer polyol of Example 2 | 40 | — | — | — |

-continued

|  | A | B | C | D |
|---|---|---|---|---|
| Partially ethoxylated polyoxyalkylene triamine of Example 1 | — | — | 40 | — |
| 5,000 molecular wt. polyoxyalkylene triamine[b] | — | — | — | 60 |
| Prior art polymer polyol[c] | — | — | — | 40 |
| Water | 3.5 | 3.5 | 3.5 | 3.5 |
| L-5309 silicone[d] | 1.5 | 1.5 | 1.5 | 1.5 |
| THANCAT ® TD-33[e] | 0.45 | 0.45 | 0.45 | 0.45 |
| NIAX ® A-1[f] | 0.08 | 0.08 | 0.08 | 0.08 |
| THANCAT ® DM-70[g] | 0.3 | 0.3 | 0.3 | 0.3 |
| UL-1[h] | 0.01 | 0.01 | 0.01 | 0.01 |
| 80:20 TDI/MONDUR ® MR[i] | 43.5 | 42.7 | 44 | 42.4 |
| NCO/OH | 1.02 | 1.02 | 1.02 | 1.02 |
| Details of Preparation |  |  |  |  |
| Cream time, sec | 7-8 | 8 | 6 | Too reactive to determine |
| Rise time, sec | 115-120 | 120 | 110-120 |  |
| Gel time, sec | 195-210 | 240 | 135-150 |  |
| Properties |  |  |  |  |
| Foam appearance | Good | Shrunk Badly | Shrunk Badly | Gelled on Mixer |
| Density, pcf | 1.9 |  |  |  |
| Chatillon gauge reading, 25%, lb | 2.77 | — | — | — |

[a]THANOL ® SF-5505; a product of Texaco Chemical Co.
[b]JEFFAMINE ® T-5000; a product of Texaco Chemical Co.
[c]THANOL ® SF-5505 containing 17% polymerized acrylonitrile and styrene (40:60 by wt); a product of Texaco Chemical Co.
[d]A product of Union Carbide Corp.
[e]33% triethylenediamine in propylene glycol made by Texaco Chemical Co.
[f]70% bis(dimethylaminoethyl)ether in dipropylene glycol.
[g]70% dimethylpiperazine and 30% dimorpholinoethyl ether made by Texaco Chemical Co.
[h]A product of Witco Chemical Co.
[i]2.7 functionality polymeric isocyanate; a product of Mobay Chemical Co.

EXAMPLE 4

This example will comapre the use of the polymer polyol of Example 2 with a prior art polymer polyol (NIAX ® 34-28 made by Union Carbide Co.). It will further show that the polymer polyols of this invention produce faster curing foams which are 10% firmer than those made from the prior art polymer polyol.

|  | A | B |
|---|---|---|
| Formulation, pbw |  |  |
| Polymer polyol of Example 2 | 40 | — |
| NIAX 34-28[a] | — | 40 |
| THANOL SF-5505 | 60 | 60 |
| Water | 3.5 | 3.5 |
| L-5309 silicone | 1.5 | 1.5 |
| THANCAT TD-33 | 0.45 | 0.45 |
| NIAX A-1 | 0.08 | 0.08 |
| THANCAT DM-70 | 0.3 | 0.3 |
| UL-1 | 0.01 | 0.01 |
| 80:20 TDI/MONDUR MR | 43.5 | 42.5 |
| NCO/OH | 1.02 | 1.02 |
| Details of Preparation |  |  |
| Cream time, sec | 7-8 | 8 |
| Rise time, sec | 115-120 | 110 |
| Gel time, sec | 195-210 | 240 |
| Properties |  |  |
| Foam appearance | Good | Good |
| Density, pcf | 1.9 | 1.9 |
| Chatillon gauge reading, 25%, lb[b] | 2.77 | 2.52 |

[a]A 28 hydroxyl no. polymer polyol made by Union Carbide Corp. using a 5,000 molecular weight ethylene oxide-capped polyol as the dispersing media, and which contains approximately 20 wt. % polymerized acrylonitrile and styrene.
[b]Manual model LIC compression tester manufactured by John Chatillon and Sons, Inc.

I claim:

1. A vinyl polymer polyol which provides faster curing polyurethane foams with improved load bearing properties, prepared by the process comprising polymerizing via a free radical initiated reaction a monomer component consisting of a mixture of styrene and acylonitrile in the presence of a partially alkoxylated polyoxyalkyleneamine containing both —NH₂ and —OH groups as the dispersing media.

2. The vinyl polymer polyol of claim 1 in which the monomer component is a mixture of styrene and acrylonitrile in weight ratios of 9:1 to 1:9.

3. The vinyl polymer polyol of claim 1 in which the polymer loading of the partially alkoxylated polyoxyalkyleneamine is in the range of about 5 to 50 wt. %.

4. The vinyl polymer polyol of claim 1 in which a free radical initiator is employed in a concentration of from 0.1 to 5.0% and which is selected from the group consisting of organic peroxides, peroxydicarbonates, peroxyesters, 2,2'azobis(2,4-dimethylvaleronitrile), 2,2'-azobis(isobutyronitrile), .2,'-azo-bis (2-methylbutyronitrile), 1'-azobis(cyanocyclohexane), and mixtures thereof.

5. The vinyl polymer polyol of claim 1 in which the reaction is conducted at a temperature in the range of 75° to 150° C. and at a pressure in the range of atmospheric to about 100 psig.

6. A vinyl polymer polyol which provides faster curing polyurethane foams with improved load bearing properties, prepared by the process comprising polymerizing via a free radical initiated reaction a vinyl monomer component consisting of styrene and acrylonitrile in the presence of a partially alkoxylated polyoxyalkyleneamine having a 2,000 to 8,000 molecular weight and containing both —NH₂ and —OH groups, in which the polymer loading of the partially alkoxylated polyoxyalkyleneamine is in the range of about 5 to 50 wt. %.

7. The vinyl polymer polyol of claim 6 in which the vinyl monomer component is a mixture of styrene and acrylonitrile in weight ratios of 9:1 to 1:9.

8. The vinyl polymer polyol of claim 6 in which a free radical initiator is employed in a concentration of from 0.1 to 5.0 wt. % and which is selected from the group consisting of organic peroxides, peroxydicarbonates, peroxyesters, 2,2'azobis(2,4-dimethylvaleronitrile), 2,2'-azobis(isobutyronitrile), 2,2'-azobis(2-methylbutyronitrile), 1,1'- azobis(cyanocyclohexane), and mixtures thereof.

9. The vinyl polymer polyol of claim 6 in which the reaction is conducted at a temperature in the range of 75° to 150° C. and at a pressure in the range of atmospheric to about 100 psig.

10. A vinyl polymer polyol prepared by the process which comprises polymerizing via a free radical initiated reaction a vinyl monomer component consisting of styrene and acrylonitrile in a weight ratio ranging from 9:1 to 1:9, using a partially alkoxylated polyoxyalkyleneamine having a 2,000 to 8,000 molecular weight and containing both —NH$_2$ and —OH groups as the dispersing media, at a temperature in the range of 75° to 150° C. and a pressure in the range of atmospheric to about 100 psig, to give a vinyl polymer polyol with a polymer loading in the range of 5 to 50% and which provides faster curing polyurethane foams with improved load bearing properties.

11. The vinyl polymer polyol of claim 10 in which a free radical initiator is employed in a concentration of from 0.1 to 5.0% and which is selected from the group consisting of organic peroxides, peroxydicarbonates, peroxyesters, 2,2'azobis(2,4-dimethylvaleronitrile), 2,2'-azobis(isobutyronitrile), 2,2'-azobis(2-methylbutyronitrile), 1,1'-azobis(cyanocyclohexane), and mixtures thereof.

* * * * *